(12) United States Patent
Brogger

(10) Patent No.: US 12,499,485 B2
(45) Date of Patent: Dec. 16, 2025

(54) GLOBAL LIQUIDITY AND SETTLEMENT SYSTEM

(71) Applicant: Forge Global, Inc., San Francisco, CA (US)

(72) Inventor: Greg Brogger, San Francisco, CA (US)

(73) Assignee: Forge Global, Inc., San Francisco, CA (US)

( * ) Notice: Subject to any disclaimer, the term of this patent is extended or adjusted under 35 U.S.C. 154(b) by 122 days.

(21) Appl. No.: 18/601,610

(22) Filed: Mar. 11, 2024

(65) Prior Publication Data

US 2024/0212047 A1 Jun. 27, 2024

Related U.S. Application Data

(60) Continuation of application No. 17/547,070, filed on Dec. 9, 2021, now Pat. No. 11,961,141, which is a (Continued)

(51) Int. Cl.
*G06Q 40/04* (2012.01)
*G06Q 20/36* (2012.01)
(Continued)

(52) U.S. Cl.
CPC ......... *G06Q 40/04* (2013.01); *G06Q 20/3678* (2013.01); *G06Q 20/3825* (2013.01);
(Continued)

(58) Field of Classification Search
CPC ............... G06Q 40/04; G06Q 20/3678; G06Q 20/3825; G06Q 30/0633; G06Q 2220/00; H04L 9/14; H04L 2209/56
See application file for complete search history.

(56) References Cited

U.S. PATENT DOCUMENTS 8,751,362 B1 6/2014 Lutnick et al.
8,793,176 B2 7/2014 Bartolucci
(Continued)

FOREIGN PATENT DOCUMENTS

AU 2017100426 A4 6/2017
CN 109889504 B 8/2020
(Continued)

OTHER PUBLICATIONS

Alexandra Covaci, et al., NECTAR: Non-Interactive Smart Contract Protocol Using Blockchain Technology, Mar. 13, 2018, arXiv, pp. 1-8 (Year: 2018).*

(Continued)

*Primary Examiner* — Nilesh B Khatri
(74) *Attorney, Agent, or Firm* — Perkins Coie LLP; Alberto Araiza; Aidan Faustina

(57) ABSTRACT

A computer-implemented method for performing a digital currency escrow swap on a network of nodes is disclosed. The method includes placing transfer orders through an intermediate node and sending signed transfer order transactions with digital wallets to an escrow swap node. The method further includes performing a transfer-in order finishing operation by requesting a transfer of digital currency to the escrow swap node and receiving the digital currency via the transfer-in node. For each sell order, digital securities are transferred to the escrow swap node via the transfer-out node. The digital securities are sent from the escrow swap node. For each transfer-out order, the digital currency is sent to the transfer-out node. The method includes an analogous operation to finish a transfer-out order.

20 Claims, 9 Drawing Sheets

Related U.S. Application Data division of application No. 16/397,852, filed on Apr. 29, 2019, now Pat. No. 11,210,736.

(60) Provisional application No. 62/663,889, filed on Apr. 27, 2018.

(51) Int. Cl.
  *G06Q 20/38* (2012.01)
  *H04L 9/14* (2006.01)
  *G06Q 30/0601* (2023.01)

(52) U.S. Cl.
  CPC ........... *H04L 9/14* (2013.01); *G06Q 30/0633* (2013.01); *G06Q 2220/00* (2013.01); *H04L 2209/56* (2013.01)

(56) References Cited

U.S. PATENT DOCUMENTS

| | | | |
|---|---|---|---|
| 10,171,245 B2 | 1/2019 | Wilkins et al. | |
| 10,269,009 B1 | 4/2019 | Winklevoss et al. | |
| 10,467,694 B2 | 11/2019 | Katsuyama et al. | |
| 10,540,654 B1 | 1/2020 | James et al. | |
| 11,210,736 B2 | 12/2021 | Brogger | |
| 11,271,736 B2* | 3/2022 | Allen | G06Q 20/065 |
| 2004/0088242 A1 | 5/2004 | Ascher et al. | |
| 2004/0148248 A1 | 7/2004 | Allen et al. | |
| 2015/0066748 A1* | 3/2015 | Winslow | G06Q 20/3676 705/39 |
| 2015/0073967 A1 | 3/2015 | Katsuyama et al. | |
| 2015/0324768 A1* | 11/2015 | Filter | G06Q 20/023 705/41 |
| 2016/0321751 A1 | 11/2016 | Creighton, IV et al. | |
| 2016/0350749 A1 | 12/2016 | Wilkins et al. | |
| 2017/0187535 A1* | 6/2017 | Middleton | G06Q 20/10 |
| 2017/0243289 A1* | 8/2017 | Rufo | G06Q 40/04 |
| 2017/0293899 A1 | 10/2017 | Furche et al. | |
| 2017/0293912 A1 | 10/2017 | Furche et al. | |
| 2018/0060860 A1* | 3/2018 | Tian | G06Q 20/3829 |
| 2018/0096360 A1* | 4/2018 | Christidis | H04L 9/0643 |
| 2018/0357715 A1* | 12/2018 | Jones | G06Q 20/36 |
| 2019/0066205 A1* | 2/2019 | Marks | G06Q 20/3678 |
| 2019/0066206 A1 | 2/2019 | Marks | |
| 2019/0068365 A1* | 2/2019 | Wright | G06Q 20/4015 |
| 2019/0340685 A1 | 11/2019 | Wade et al. | |
| 2019/0340689 A1 | 11/2019 | Gordon et al. | |
| 2020/0020032 A1 | 1/2020 | Bleznak et al. | |
| 2022/0253815 A1* | 8/2022 | Winslow | G06Q 20/108 |

FOREIGN PATENT DOCUMENTS

| | | |
|---|---|---|
| CN | 108830727 B | 11/2020 |
| CN | 109670801 B | 2/2021 |
| EP | 3745343 A1 | 12/2020 |
| WO | 2014043420 A1 | 3/2014 |
| WO | 2015101403 A1 | 7/2015 |
| WO | 2017007806 A1 | 1/2017 |
| WO | 2017131929 A1 | 8/2017 |
| WO | 2017145020 A1 | 8/2017 |
| WO | 2017178887 A2 | 10/2017 |
| WO | 2019043668 A1 | 3/2019 |

OTHER PUBLICATIONS

Eric Wall et al: "Using Blockchain Technology and Smart Contracts to Create a Distributed Securities Depository", Jun. 29, 2016 XP055647647, URL:http://lup.lub.lu.se/luur/download?func=downloadFile&recordOId=8885750&fileOId=8885765 [Nov. 29, 2019].

Extended European Search Report for EP Patent Application No. 19793099.3, dated Dec. 21, 2021.

Lee , et al., "Exeum: A Decentralized Financial Platform for Price-Stable Cryptocurrencies", Exeum Foundation, all pages. (Year: 2018).

Massacci, F. , et al., "FuturesMEX: Secure, Distributed Futures Market Exchange", 2018 IEEE Symposium on Security and Privacy (SP), 2018, pp. 335-353, doi: 10.1109/SP.2018.00028. (Year: 2018).

Pop, C. , et al., "Decentralizing the Stock Exchange using Blockchain An Ethereum-based implementation of the Bucharest Stock Exchange", IEEE 14th International Conference on Intelligent Computer Communication and Processing (ICCP), 2018, pp. 459-466, doi: 10.1109/ICCP.2018.8516610. (Year: 2018).

* cited by examiner

GLOBAL LIQUIDITY AND SETTLEMENT SYSTEM

CROSS-REFERENCE TO RELATED APPLICATION

This application is a continuation of U.S. patent application Ser. No. 17/547,070, filed Dec. 9, 2021 and titled "Global Liquidity and Settlement System," which is a divisional application of U.S. patent application Ser. No. 16/397,852, filed Apr. 29, 2019, now U.S. Pat. No. 11,210,736, and titled "Global Liquidity and Settlement System," which claims the benefit of priority to U.S. Provisional Application No. 62/663,889, filed Apr. 27, 2018 and titled "Global Settlement Network," which are all incorporated herein by reference in their entireties.

TECHNICAL FIELD

The disclosed teachings generally relate to a decentralized settlement network. The disclosed teachings more particularly relate to a decentralized global liquidity and settlement system that enables participants that utilize cryptocurrency platforms to compliantly settle cross-border token trades.

BACKGROUND

The advent of cryptocurrencies and blockchain tokens can fundamentally remake private capital markets. In 2017, the aggregate value of all tokens grew to $37.7 billion, which is a nearly 19,000% increase over the prior year. Further, total capital raised through initial coin offerings (ICOs) in 2017 was $6.2 billion. That number increased in 2018 to $7.9 billion, though barely 20% of the total was raised in the second half of the year. To provide a benchmark for funding that occurs through token sales, consider that the total raised by U.S. startups (i.e., seed and Series A) in 2017 by using traditional private placement process is estimated to be $8 billion.

Further expansion of the blockchain-enabled capital market is threatened by a fundamental problem that regulators in the United States and other jurisdictions are deeming that many tokens are securities and thereby invoking the application of securities laws to those tokens. This includes requiring security tokens to be traded only on regulated trading systems and exchanges. Existing trading platforms, most of which lack licenses in any jurisdiction, find themselves faced with a very significant dilemma. If the trading platforms wish to facilitate the trading of tokens that regulators may deem to be securities, they can either: (a) register as a broker-dealer in each country where they have a material numbers of users, (b) choose not to register, and risk becoming the target of regulatory enforcement and other legal action from such countries, or (c) cease enabling trading by users in these countries. These choices present token trading platforms with material problems.

SUMMARY

The disclosed embodiments include a computer-implemented method for performing a token escrow swap on a network of nodes. The method includes placing buy/sell orders through a broker-dealer node and sending signed buy/sell order transactions with cryptocurrency wallets to the token escrow swap node. The method further includes performing a buy-order filling operation by requesting a transfer of currency tokens to the token escrow swap node to fill the buy order and receiving the currency tokens via the buyer node. For each sell order, security tokens are transferred to the token escrow swap node via the seller node. The security tokens are then sent from the token escrow swap node. For each sell order, the currency tokens are sent to the seller node. The method incudes an analogous operation to fill a sell order.

Other aspects of the technique will be apparent from the accompanying Figures and Detailed Description.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Various features and attributes of the disclosed technology will become more apparent to those skilled in the art from a study of the Detailed Description in conjunction with the drawings. Embodiments of the disclosed technology are illustrated by way of example and not limitation in the drawings, in which like references indicate similar elements.

Figure 1:
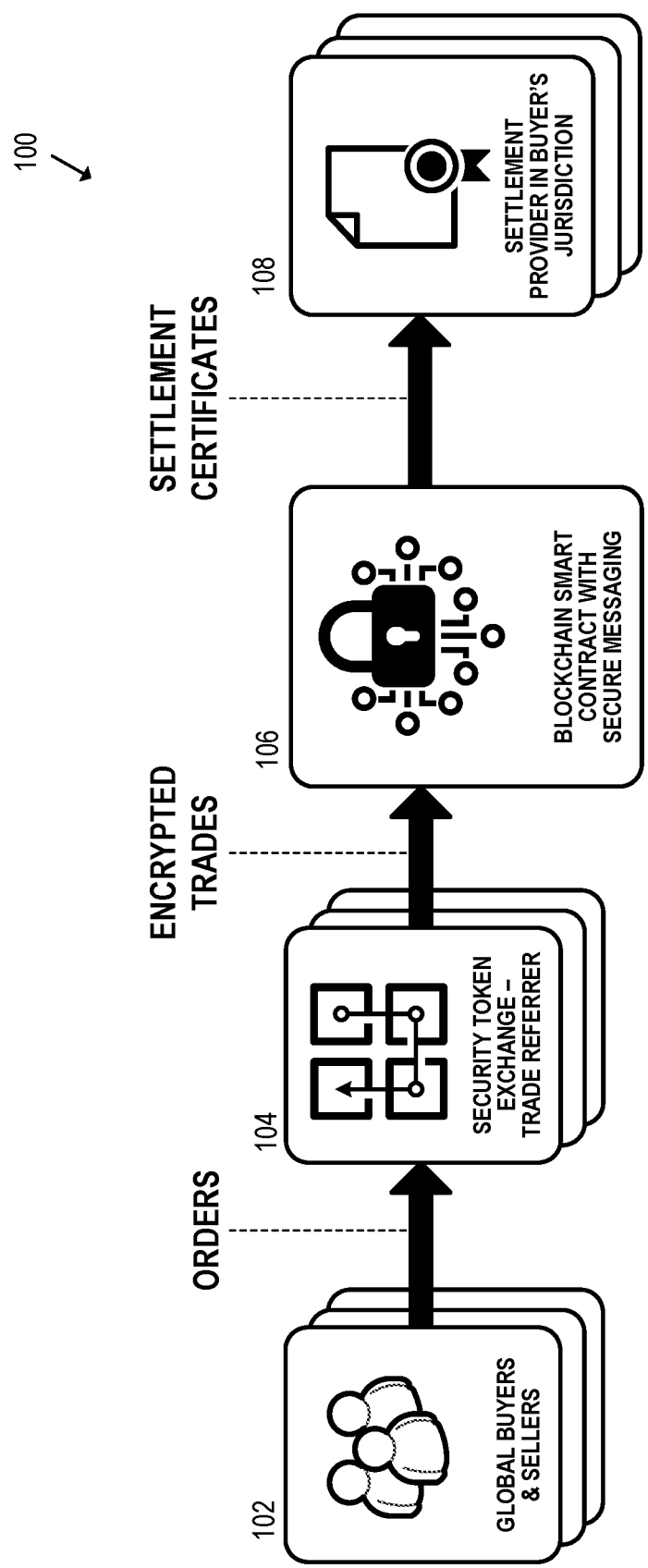
FIG. 1 is a high-level diagram of a process for a global liquidity and settlement system (GLASS) network according to some embodiments of the present disclosure.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The embodiments set forth below represent necessary information to enable those skilled in the art to practice the embodiments and illustrate the best mode of practicing the embodiments. Upon reading the following description in light of the accompanying Figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure.

Reference to "one embodiment" or "an embodiment" means that a particular feature, structure, or attribute described in connection with the embodiment is included in at least one embodiment of the disclosure. The appearances of the phrase "in one embodiment" in this disclosure are not necessarily all referring to the same embodiment, nor are separate or alternative embodiments necessarily mutually exclusive of other embodiments. Moreover, various features are described that may be exhibited by some embodiments and not by others. Similarly, various requirements are described that may be requirements for some embodiments and not for other embodiments.

As used herein, unless specifically stated otherwise, terms such as "processing," "computing," "calculating," "determining," "displaying," "generating," or the like, refer to actions or processes of an electronic device that manipulates and transforms data, represented as physical (electronic) quantities within the computer's memory or registers, into other data similarly represented as physical quantities within the device's memory, registers, or other such storage medium, transmission, or display devices.

When used in reference to a list of multiple items, the word "or" is intended to cover all of the following interpretations: any of the items in the list, all of the items in the list, and any combination of items in the list.

Unless the context clearly requires otherwise, throughout the description and the embodiments, the words "comprise," "comprising," and the like are to be construed in an inclusive sense, as opposed to an exclusive or exhaustive sense; that is to say, in the sense of "including, but not limited to."

As used herein, the terms "connected," "coupled," or any variant thereof, means any connection or coupling, either direct or indirect, between two or more elements; the coupling of or connection between the elements can be physical, logical, or a combination thereof. For example, two components may be coupled directly to one another or via one or more intermediary channels or components. As another example, devices may be coupled in such a way that information can be passed there-between, while not sharing any physical connection with one another.

Where context permits, words in the Detailed Description using the singular or plural form may also include the plural or singular form, respectively.

As used herein, the "global liquidity and settlement system" (GLASS) refers to a decentralized network or platform that enables cryptocurrency platforms to compliantly settle cross-border token trades. Exchanges can market to and serve participants in any jurisdiction regardless of whether the tokens being traded are deemed securities in that jurisdiction.

As used herein, the term "trade referral" or variants thereof is a component of the GLASS network. An entity can have a trade referrer role; the user type being a token trading platform or exchange. A function of this role is to obtain compliant settlements of trades by non-resident participants. A trade referrer is not required to have a stake in the GLASS network. The trade referrer pays a non-refundable network fee for each trade submitted to the GLASS network, as well as a settlement fee for each trade cleared through the GLASS network.

As used herein, the term "trade settlement" or variants thereof is a component of the GLASS network. An entity can have a "settlement provider" role; the user type being a licensed entity (e.g., lternative trading system (ATS), broker-dealer). A function of this role is to share in network fees and earn settlement fees by settling trades in local jurisdictions for trade referrers. The settlement provider needs a stake in the GLASS network (i.e., stake in GLASS tokens). A settlement provider can receive a share of network fees in proportion to its stake relative to aggregate settlement provider stakes. The settlement provider can also receive settlement fees for each trade that it clears.

The disclosed GLASS network can eliminate the need for exchanges to determine whether tokens are securities in any jurisdiction (e.g., country). Each jurisdiction can have one or more licensed entities (e.g., ATS, broker-dealer) on the network to settle trades in that jurisdiction without materially impeding trading speeds. Participating exchanges can lower their regulatory risk because a local regulated entity can be responsible for each trade's compliance with local securities laws. Because the trades will be settled by entities licensed for securities transactions, the distinction between utility tokens and security tokens is largely irrelevant for participating exchanges. This will free exchanges to acquire customers in the U.S. and other jurisdictions now actively regulating tokens as securities.

SHARESPOST, of San Francisco, California, pioneered a platform that enables online trading of shares of private companies by matching buyers and sellers in transactions involving shares of the private companies. SHARESPOST also pioneered in the digital securities space by completing a secondary trade of a digital security and being the first to involve the custody of clients' digital assets. The trading platform would be registered with the U.S. Securities Exchange Commission (SEC) as an ATS and a member of the financial industry regulatory authority (FINRA) as a clearing broker-dealer.

The GLASS network can include registered entities in different jurisdictions to facilitate trades. The registered entities can be settlement providers on the GLASS network that provide immediate coverage in key financial centers. To earn settlement and network fees, other licensed platforms join the network as settlement providers. An administrative entity of the GLASS network can provide regulatory review of settlement providers and ensure that each operates in compliance with the local laws of its jurisdiction. In some embodiments, a community of settlement providers and trading platforms are self-governing.

The disclosed embodiments include a marketplace for investor participants to interact with token issuers, to provide access to primary issuances, and secondary trading, as well as data and research to help the participants make informed investment decisions. Trading can be linked to administered brokerage accounts where both fiat and cryptocurrencies, as well as digital and traditional securities, can be securely custodied and managed. The inventor participants are registered entities including institutions or accredited investors. They can provide buy-side demand from the U.S. seeking liquidity on the GLASS network. Therefore, the GLASS network allows for participating exchanges to settle compliant transactions in tokenized securities across multiple jurisdictions.

General Overview of Token Markets

In 2017, companies raised $6.2 billion through the primary sale of tokens. This represented a 6,900% increase over capital raised by token issuers in 2016. Although initial coin offering (ICO) fundraising increased from 2017 to 2018, ICO fundraising tightened over that period. The tightening can be attributable to certain factors. For example, a factor that has led to a decrease in ICO fundraising is compliance cost that issuers incur in order to comply with increased regulation. For several years, token issuers completely disregarded security issuance laws, either due to unfamiliarity with regulations, insistence that their offerings were not securities, or due to the belief that regulators were turning a blind eye. Given that regulators have not turned a blind eye to ICOs, the pace of fundraising has slowed considerably. Issuers must now navigate complex, time consuming, and cost-prohibitive regulatory issues. As such, many would-be ICO issuers are finding the regulatory climate too convoluted and are forgoing the token fundraising model altogether.

Prior to modern regulations, ICO investors were able to resell their tokens at any time after issuance. This is no longer possible in most jurisdictions. In the U.S., for example, most token issuances must be held by the initial investor for at least one year before they can be resold due to the tokens being deemed securities. This restriction, coupled with a more bearish market, has caused investors to invest more carefully because they do not have the option to exit their position for at least a year.

Early token issuers raised capital to finance the build-out of technology protocols and applications. As the industry has matured, issuers are now creating new applications for digital tokens and smart contracts. Issuers are creating products that have established real-world value, while still retaining the benefits and efficiencies of blockchain technology. Examples of the products include asset-backed tokens in which the token represents an interest in a fund (e.g., Blockchain Capital's BCAP token) or other asset (e.g., fiat currencies, real estate, commodities). Some companies seek to issue tokens representing traditional equity instruments (e.g., Finom's FIN token represented a share of Common Stock). These assets are commonly called "security tokens," and the initial sale of tokenized securities is commonly called a security token offering (STO). The STO market may rapidly become a larger market than the current utility token market once regulations are clarified.

The success of many startups in raising material capital has encouraged other private companies, many further along in their lifecycle, to leverage the power and flexibility of token financings. In fact, private technology companies with market caps in excess of $1 billion (commonly referred to as "unicorns") have planned to tokenize parts of their existing businesses. Tokenized security issuances by globally recognized companies promise to bring more mainstream investors to the token market.

Regulators were initially slow to react to the advent of cryptocurrencies and token economies. However, regulators have forced token platforms to evolve. Decentralized cryptocurrencies and digital tokens are dramatically different than traditional fiat currencies and securities. Blockchain technology has led to the creation of new kinds of financial instruments and transactions. As a result, regulators around the world needed time to understand these new technologies and their impact on financial markets. In 2017, regulators began to take positions on how tokens should be treated under securities laws.

The new regulatory demands have created a significant challenge for token trading platforms. Online trading platforms are global and, as such, users come from many different jurisdictions. This problem was overlooked when platforms took the position that they were not trading securities and were not subject to regulation. However, regulatory bodies have now deemed that many tokens are securities that will get regulated accordingly, along with the entities that facilitate their trading.

Trading platforms have limited options to respond to recent regulations. For example, the trading platforms must either develop a compliance mechanism in each jurisdiction where they have a material number of users or refuse to facilitate security token trading for those users. The former could be operationally impractical, and the latter could result in a significant loss of revenue. Alternatively, the trading platforms can choose to defy regulators and become "black hat" operations that evade government enforcement actions. It appears unlikely that platform operators could successfully circumvent government action over the long term and such platforms could become fringe players that are unable to retain mainstream investors and institutions. The uncertainty regarding how platforms and regulators should proceed has hindered ICO markets.

In the U.S., the SEC has stated its position on ICOs in its enforcement action against issuers of the DAO token. Relying on established case law, the SEC applied the "Howey test" to determine if the DAO tokens were securities. Succinctly stated, the Howey test holds that if the value of a token depends on what the issue builds with the proceeds of the token sale, then the token is a security. The SEC remains active in enforcing its position that many tokens are securities. A group was formed within the SEC for reviewing token offerings and ensuring compliance with U.S. securities laws. Enforcement actions have since been taken against issuers during their ICOs, shutting down those offerings and forcing a return of capital raised.

Currently, securities tokens can only be legally traded in the U.S. on an ATS or national exchange. Accordingly, the SEC has warned investors about unlicensed platforms presenting themselves as legitimate exchanges. As a result, existing token platforms have been served with subpoenas and voluminous information requests for investigations that could result in legal action. Regulatory review of cryptocurrency trading platforms has been undertaken for some offshore platforms including Binance, Bittrex, Huobi, and many others. The investigation will likely present onshore and offshore crypto trading platforms with another regulator review of their compliance in serving U.S. investors. In addition, legislation has been recently introduced to regulate cryptocurrency and other tokens as a new, legally distinct asset class. This has essentially shutdown the ICO model of fundraising in the U.S.

As such, security token offerings have a cost-prohibitive, time consuming path that seems completely unnecessary. As a result, issuers, trading platforms, advisors and other token service providers have put their U.S. businesses on hold until the SEC provides greater regulatory clarity and a compliant way to trade tokens.

In China, the central government has not yet released a detailed policy on cryptocurrencies and tokens. But the country's actions suggest Chinese authorities may take a hardline on tokens. Regulators have banned ICOs and ordered domestic cryptocurrency exchanges to stop trading. Companies that already issued tokens have been required to refund money to investors. However, over-the-counter (OTC) trading of bitcoin and other cryptocurrencies continues. Investors flocked to overseas trading services or are using virtual private networks to trade tokens in Japan and Hong Kong. Chinese officials have reportedly considered whether to block access to these foreign exchanges as well. The Cyberspace Administration of China (CAC) doubled down on their anti-crypto measures by requiring that chat app providers such as WeChat comply with public orders to eliminate messages regarding cryptocurrency. In addition, the security token offerings have been considered as illegal financial activity.

Japan has been more welcoming to cryptocurrencies perhaps because it has a history of being a foreign currency exchange center. The Financial Services Agency of Japan (FSA) said that certain digital coins can be considered "virtual currency" if people use them to pay for goods and services or exchange for other digital currencies. It has been reported that the FSA will launch regulations limiting individual investment in ICOs to protect investors.

In Singapore, the Monetary Authority of Singapore (MAS) has focused its activity around anti-money laundering regulations. The MAS said securities laws might also apply to ICOs. The MAS said it could categorize some tokens as "capital market products" which would be regulated under the country's Securities and Futures Act. The MAS released case studies of tokens and their analysis of whether the token would be a security. The MAS updated its guidance to elaborate on how parties involved in a digital asset offering should adhere to anti-money laundering (AML) and counter financing of terrorism (CFT) regulations.

In South Korea, the Financial Services Commission (FSC) prohibited domestic companies and startups from holding ICOs. China's crackdown on token exchanges prompted many Chinese investors to migrate their trading activity to South Korean exchanges. In an effort to limit cryptocurrency and token trading activity to adults trading on local exchanges, South Korea banned foreigners and minors from creating exchange accounts. The country also prohibited anonymous accounts. As a result, many South Korean blockchain companies set up crypto-havens in Switzerland, Gibraltar and Singapore. The South Korean government has considered lifting the ICO ban with plans to tax cryptocurrencies and ICOs. Like in other jurisdictions, crypto platforms have been the subject of investigations and criminal actions have been taken when deemed necessary.

In the European Union, the European Securities and Markets Authority (ESMA) said it would only regulate ICOs if the tokens qualify as financial instruments. At the same time, the ESMA emphasized the need to ensure investors are well informed and protected. To combat money laundering and funding of terrorist groups, the European Council is considering steps to ensure investors identify themselves. The European Commission (EC) has also banned EU countries from creating their own cryptocurrencies, fearing banks will lose control over the money supply. European finance ministers have agreed that there in no hurry to accelerate crypto regulation; instead, they prefer to wait on analyses from authorities before deciding on next steps. The European Banking Authority (EBA) and ESMA separately published reports on crypto assets. The EBA called on the EC to assess if regulatory action will be needed to achieve an EU-wide approach to crypto. ESMA, on the other hand, analyzed how existing securities laws could be applied to digital assets, and advised the EC of any regulatory gaps that must be considered.

The disclosed GLASS network overcomes many of the aforementioned drawbacks and barriers that exist due to diverse jurisdictional factors. The GLASS network is the first cross-border transaction settlement network. Prior platforms were licensed to trade cryptocurrencies in their limited local jurisdictions. Some unlicensed ICO platforms and advisors in the U.S. seek to register with authorities or have already commenced the process of doing so. An entity in the U.S. can trade digital securities with the appropriate registrations. However, that entity may not have demonstrated the ability to provide custody for clients' digital securities and may lack experience as a secondary marketplace for private securities. Given the arduous registration process, there are currently no ATSs trading material volumes of unregistered securities.

U.S. regulatory approvals required for a security token trading platform include various features. A feature includes creation or acquisition of a broker-dealer member of FINRA with a membership agreement that specifically authorizes transactions in unregistered, uncertificated securities of a non-reporting issuer. Other features include registration of that broker-dealer with Securities Investor Protection Corporation (SIPC) and registration of that broker-dealer with the SEC as an ATS and completion to the satisfaction of the SEC of a Form ATS.

Regulatory approvals are just the first step in becoming a compliant and fully operational token trading platform. For example, in the U.S., a token trading platform needs to demonstrate achievement of the following list of requirements to FINRA before being permitted to commence trading operations:

A technology and process that can reliably accredit investors to preserve an exemption from registration requirements under U.S. securities laws;

A technology and process that can reliably ensure proper collection and archival of customer information and documents and that apply Know Your Customer (KYC) requirements to transacting parties;

A technology, process, and licensed personnel that can reliably ensure transactions are vetted pursuant to Anti-Money Laundering (AML) laws;

Trading and order matching systems that meet a host of technical requirements including Best Execution requirements (i.e., the obligation of broker-dealers and market makers to execute customer orders at the best available price);

A technology and process that meets FINRA mandated cybersecurity requirements;

Adequately trained, FINRA licensed (typically Series 7 and 63) individuals to manage transactions and any customer interactions regarding securities; and FINRA registered compliance staff to oversee those individuals.

Finally, additional compliance procedures are necessary for a registered broker-dealer to maintain custody of digital assets. The compliance procedures include compliance with SEA Rule 15c3-3: enhanced disclosure requirements, to custody client funds; and advanced technological stack and rigorous internal procedures to ensure safety of clients' custodied digital assets.

Unlike most U.S. platforms that are still in the registration process or that have yet to start the registration process, the disclosed network has presumably completed its first secondary digital security transaction and is able to distribute and trade security tokens. As such, the disclosed GLASS network has navigated an increasingly complex regulatory landscape to acquire the appropriate registrations and licenses to trade unregistered securities in the U.S. and in, for example, Singapore, Dubai, and Hong Kong.

The Global Liquidity and Settlement System (GLASS)

The GLASS network is the first decentralized settlement network for cross-border trades that meet applicable regulations. By ensuring compliance regardless of the locations of the buyer, seller, or trading platform connecting, and regardless of whether the token traded is a security, the GLASS network can solve regulatory constraints currently on token trading ecosystem. In one embodiment, the GLASS network includes two types of participants: settlement providers and trade referrers as described earlier.

FIG. 1 is a high-level diagram of a process 100 of the GLASS network according to some embodiments of the present disclosure. As illustrated, global buyers and sellers 102 place orders on a security token exchange 104 (trade referrer). The trades are then encrypted and send to a blockchain smart contract with secure messaging 106. The settlement certificates are then sent to a settlement provider in the buyer's jurisdiction 108.

As mentioned earlier, settlement providers are regulated entities (e.g., ATS, broker-dealers, recognized market operators). There is preferably at least one settlement provider in each country, which is licensed to facilitate security token trades by residents of that jurisdiction. In some embodiments, the GLASS network has an immediate settlement capability in the U.S. Any licensed subsidiaries in foreign countries can expand the GLASS network's regional coverage. Other out-of-network regulated entities could be encouraged to join the GLASS network and become settlement providers to earn settlement fees.

Any trading platform can join GLASS as a trade referrer, including unlicensed exchanges, broker-dealers and other transactional platforms legally permitted to refer non-resident client trades to regulated entities in the clients' home jurisdictions. When a trade referrer matches a foreign buyer and/or foreign seller in a token trade, it submits the trade to the network by: (a) sending, in encrypted format, the client and trade information that the settlement provider will need to vet the trade using a GLASS secure protocol, and (b) "depositing" the required fees in GLASS tokens into a GLASS ERC20 smart contract. Parties in trade must agree to use a third-party broker-dealer.

The settlement provider performs the required compliance functions for the trade in its jurisdiction (e.g., accreditation, KYC, AML) and assumes obligations to the client that are necessary under local regulatory requirements. If the trade is compliant, the settlement provider deposits a digital compliance certificate into the settlement network smart contract and sends the trade referrer instructions to release the client's payment/tokens to the counterparty. The trade referrer records the trade confirmation using the smart contract. The settlement provider completes the process by making any necessary reports or filings with local regulators. The compliance record for the trade is immutably stored by the GLASS smart contract should the trade referrer need to present any regulators with the compliance certificate.

Figure 2:
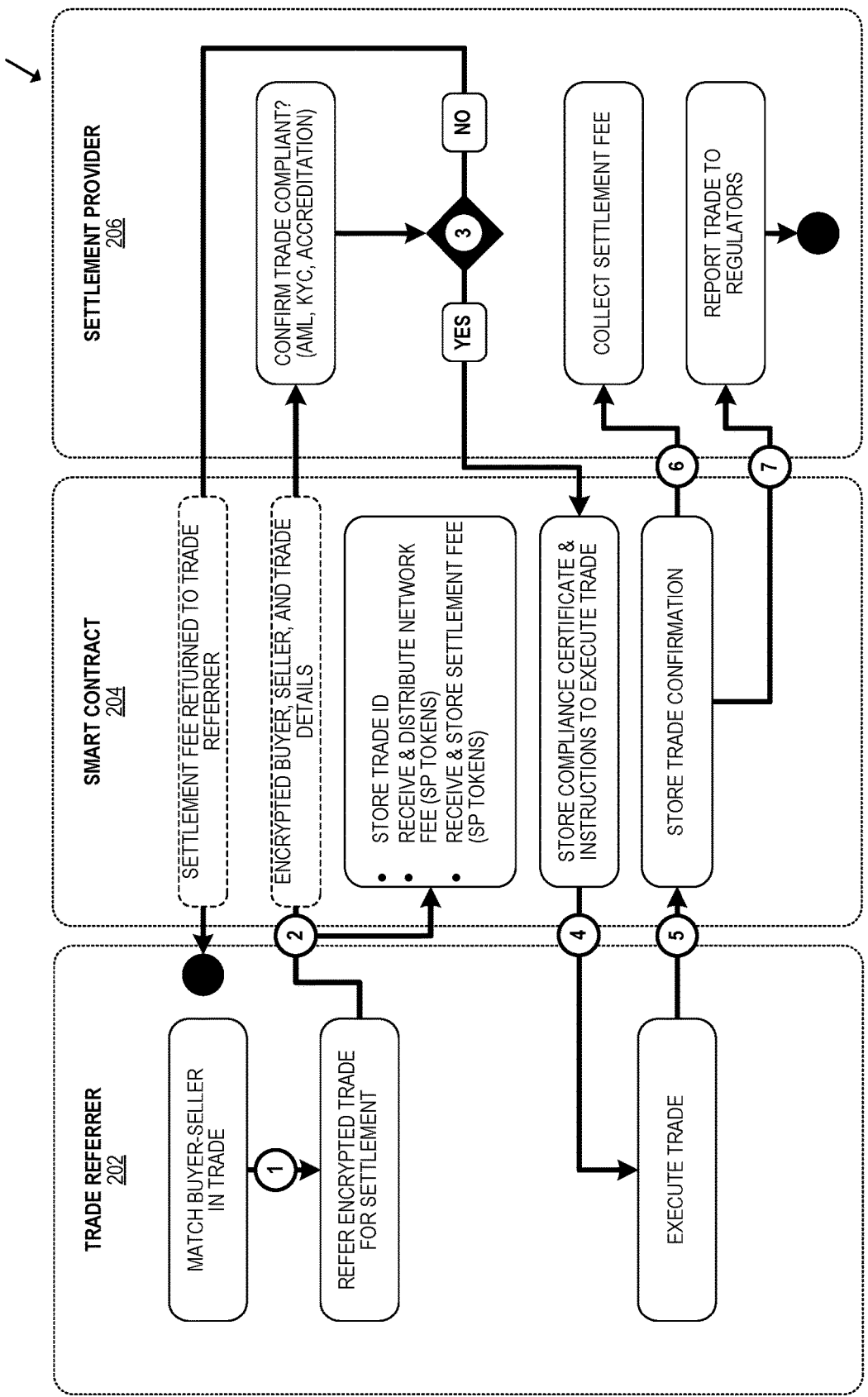
FIG. 2 is a block diagram that illustrates a flow to submit trades in a network according to some embodiments of the present disclosure.

FIG. 2 is a block diagram that shows a flow 200 to submit trades in a network according to some embodiments of the present disclosure. As shown, to submit trades to the network, trade referrers 202 include GLASS tokens to pay a network and a settlement fee of the smart contract 204. The GLASS network fee may be a relatively small, non-refundable fee that is paid by the trade referrer to compensate settlement providers 206 for being part of the network and reviewing trades for settlement. It also discourages any trade referrer from submitting spam trades. The network fee is shared by all of the settlement providers in proportion to their stake in GLASS tokens.

The settlement fee may be a relatively larger fee that is retained by the settlement provider only if it is able to clear the referred trade. The settlement fee compensates the settlement provider for the liability they assume by processing the transaction within their regulated entity. Unlike the network fee, the settlement fee is retained solely by the settlement provider clearing the trade. If a referred trade is not compliant and thus cannot be cleared by the settlement provider, the settlement fee may be returned to the trade referrer submitting the trade.

In some embodiments, a supervising entity is responsible for reviewing settlement providers seeking to join the GLASS network and confirms that they are appropriately licensed in their local jurisdictions. In some cases, approval of a settlement provider requires a legal opinion from legal counsel in the same jurisdiction as the settlement provider. Approved settlement providers will be added to the network's whitelist. The managing entity will seek to balance the number of settlement providers in each jurisdiction with the jurisdiction's trade volume. This will ensure that there is neither an over- nor undersupply of settlement providers in each jurisdiction. The managing entity can also hold settlement providers to the network's governance, confidentiality and security standards.

The GLASS network can scale with any number of settlement providers and as transaction volumes increase. As a result, settlement will become more and more efficient and costs will be continually lowered. It will therefore become relatively more and more expensive for exchanges to settle their token transactions by forming and operating their own broker-dealers or other regulated entities.

Example Technological Considerations

The GLASS network has settlement functionality based on GLASS smart contracts. The settlement functionality can be implemented by using the Solidity programming language on the Ethereum blockchain with an ERC20 compliant token ("GLASS token"). The GLASS token and GLASS smart contracts could be used to transfer settlement fees, network fees, and stakes for settlement providers. Although the GLASS token is hosted on the Ethereum blockchain, trades from any other blockchain can be settled on the GLASS network.

Any confidential information including trade data, buyer information, and seller information can be stored off-chain by trade referrers and settlement providers in encrypted JSON files. In some embodiments, only trade referrers and settlement providers that facilitate a particular trade can access an associated encrypted JSON file that stores the confidential information. Compliance certificates can be anchored to blockchain transactions by using cryptographic hashes. In some embodiments, trade details can be encrypted and routed peer-to-peer between parties. In some embodiments, only cryptographic hashes of data with one-time pads are stored on the blockchain as identifiers for notarization purposes.

The public Ethereum blockchain can be used for whitelisting settlement provider blockchain addresses and trade referrer addresses. In some embodiments, compliance certificates are stored publicly in Ethereum blockchain transactions for trade referrers and settlement providers to access at any time.

Figure 3:
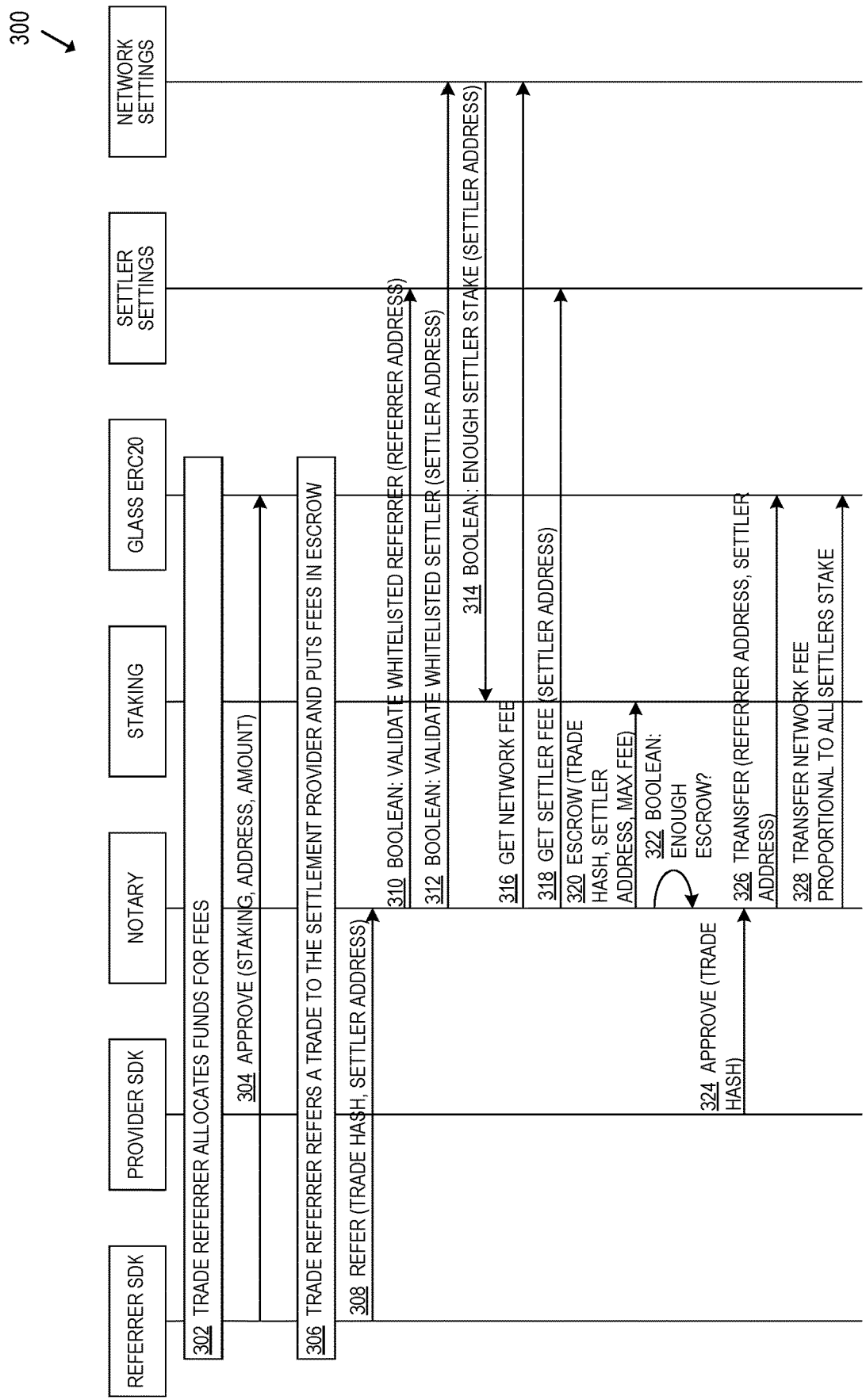
FIG. 3 is a flow diagram that illustrates a settlement process on the GLASS network according to some embodiments of the present disclosure.

FIG. 3 is a flow diagram that illustrates a settlement process 300 on the GLASS according to some embodiments of the present disclosure. In step 302, a Referrer SDK of the trade referrer allocates funds for fees in GLASS tokens. In step 304, the Referrer SDK approves the funds for the GLASS tokens. In step 306, the trade referrer refers a trade to the settlement provider and puts fees in escrow. In step 308, the Referrer SDK refers values of the trade to a Notary node. The values can include a trade hash and settler address. In step 310, the Notary node communicates a Boolean value to validate a whitelisted trade referrer, associated with a particular address, to the Settler Settings.

In step 312, the Notary node communicates a Boolean value to validate a whitelisted settler, associated with a particular settler address, to the Settler Settings. In step 314, Network Settings communicate a Boolean value for whether there is enough settler stake associated with the settler address to a Staking node. In step 316, the Notary node communicates to get the network fee associated with the Network Settings. In step 318, the Notary node communicates to get the settler fee, associated with the settler address, to the Settler Settings. In step 320, the Notary node communicates escrow information to the Staking node. The escrow information can include the trade hash, settler address, and max fee. In step 322, the Notary node checks a Boolean value to determine if the escrow was enough. In step 324, the Provider SDK of the settler provider communicates an approval to the Notary node. The approval is associated with the trade hash. In step 326, the Notary node performs a transfer of the GLASS tokens, where the transfer is performed based on the referrer address and the settler address. In step 328, the Notary node transfers a network fee to all the settlers in proportion to their stakes in GLASS tokens.

Governance of the GLASS Network

GLASS includes a governing mechanism to ensure that GLASS network participants abide by policies including rules of the network. For example, a governing mechanism can serve as an administrator that acts as a governance body. The governing mechanism can review and implement policy changes, including setting network fees and/or settlement fees, as necessary to scale and improve the effectiveness of the GLASS network. At operational efficiency and scale, the governing mechanism can be designated by settlement providers by, for example, voting in proportion to the GLASS tokens that respective settlement providers hold.

In some embodiments, the governing mechanism can function as an administrator. Alternatively, the administrator can be separate from the governing mechanism. The network administrator can review settlement providers seeking to join the GLASS network and ensure that they are licensed in compliance with local jurisdictions. In some embodiments, all trade referrers can readily join the GLASS network and settle trades once they stake the required number of GLASS tokens in the GLASS network. The settlement providers in each jurisdiction can then accept or reject referred trades on a per-trade basis. In addition, individual trade referrers are whitelisted by individual settlement providers to comply with local rules. Furthermore, subject to review by the governing mechanism, trade referrers and/or settlement providers who violate the network's rules (e.g., code of conduct) or are unsuitable to participate in the GLASS network will be removed from the GLASS network's smart contract whitelists and will not be able to use the GLASS network to refer and settle trades.

Posting Marketplace

In some embodiments, a posting marketplace is integrated with the GLASS network. The posting marketplace is a U.S. ATS that is authorized to trade digital assets. The posting marketplace connects numerous buyers, sellers, and issuers of unregistered securities in billions of dollars in compliant transactions.

The GLASS network can comply with SEC rules to trade unregistered, uncertificated securities held on distributed ledgers (i.e., security tokens). As such, an ATS can execute a secondary digital security transaction in arbitrary tokens issued by arbitrary blockchain entities. The posting is enabled for trading and custody of digital securities in the U.S. Accordingly, the posting marketplace allows companies to issue their security tokens in accordance with U.S. securities laws and buyers and sellers can trade them compliantly. A posting marketplace can join GLASS as an anchor tenant on the network, providing settlement for trade referrers.

As a FINRA-approved clearing broker-dealer, investor participants on the posting marketplace can deposit and custody fiat currencies, cryptocurrencies, and digital tokens into real brokerage accounts, regardless of whether they are securities. From those brokerage accounts, they will be able to buy and sell cryptocurrencies, utility tokens, and security tokens as well as trade shares in leading private growth companies (e.g., unicorns). The participants can also access proprietary research to gain insight into the prospects for token issuers and the value of their tokens.

In some embodiments, token issuers can use online offering process to conduct their token offerings as crowd sales under Section 506(c) of Regulation D (i.e., "crowd sales" to the public). In addition to existing investor relationships, issuers can leverage the network sales, marketing, and distribution capabilities. This includes teams of individuals located in different jurisdictions around the world. The sales teams have relationships with numerous private technology company investors transacting on the postings marketplace.

After the offering, token issuers can support their network's ecosystem by connecting and communicating with token holders on the GLASS network, which publishes research and data about private technology companies.

Figure 5:
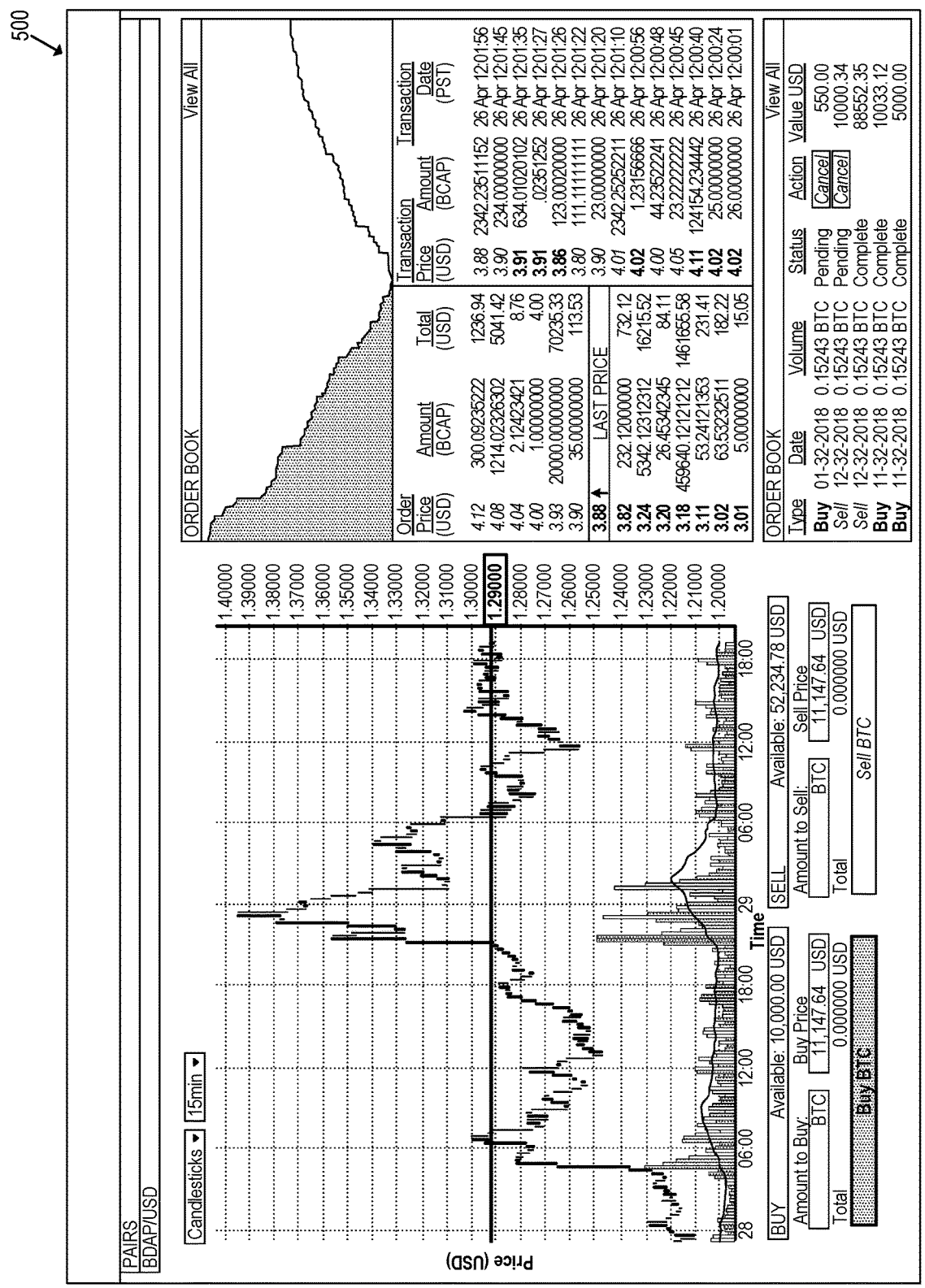
FIG. 5 is a screen view of a web security token trading interface according to some embodiments of the present disclosure.

FIG. 5 is a screen view of a web security token trading interface that could be used to track and manage security token trading information. For example, the investor participants can utilize the interface to view valuation benchmarks and indexes tracking the value of tokens. Issuer participants can make financial disclosures via the interface to token holders, where the disclosures are necessary to support compliant secondary trading in the U.S. They can also track and manage their token holder communities via their company page of a security token trading website.

GLASS Tokens

GLASS tokens can be used by participants on the GLASS network. In some embodiments, a maximum number of GLASS tokens (e.g., one billion) are generated via smart contracts during a single token generation event. In some embodiments, the GLASS tokens can be utilized for settlement purposes. For example, the GLASS network can use GLASS tokens to build and incentivize a community of crypto exchanges around the world. For participating exchanges, the GLASS network can provide a shared settlement infrastructure. The use of a shared settlement infrastructure can be taxed by charging GLASS tokens to participants in proportion to their usage. To encourage service providers to join the GLASS network and maintain the shared settlement infrastructure, the GLASS network can pay GLASS tokens to service providers.

Exchanges can have one of two roles on GLASS, each with its own token utility and operations. Trade referrers participate in staking GLASS tokens to submit token trades to the network for compliant settlements. Settlement providers can earn settlement fees and share in network fees by settling trades for trade referrers. The network fees paid by trade referrers are distributed to all settlement providers in proportion to the tokens that they have staked. The settlement fee is paid to the settlement provider only if the trade is settled. If the trade is not settled, the settlement fee is returned via smart contract to the trade referrer.

The disclosed GLASS network can be implemented as a system that includes components such as servers and other devices that are interconnected over existing networks such as the Internet. The GLASS network may include any combination of private, public, wired, or wireless portions. The data or information communicated over the GLASS network may be encrypted or unencrypted at various locations or along different portions of the network. Each component of the system may include hardware and/or software to process data or information, perform operations, and communicate over networks. A device or a component associated with the GLASS network may include a processor, memory or storage, a network transceiver, a display, OS and application software, etc. Examples of devices include smartphones, tablet computers, personal computers, and any device that is capable of communicating on the GLASS network.

Order Referring and Token Escrow Swap

Some trade referrers may not have the inventory to match both sides of a trade and rather will have only the buy or sell side. Additionally, greater liquidity needs of the GLASS network suggest accepting only one side of an order and matching on behalf of the trade referrer is prudent. As such, detailed below is how an order referrer would submit one side of a trade, leverage a token escrow swap system to facilitate settlement of the trade, and provide liquidity for an order book shared by GLASS network participants.

FIGS. 4A through 4D are flow diagrams for a token escrow swap process according to some embodiments of the present disclosure. The figures illustrate a combination of operations to complete a token escrow swap process. The operations include a buy operation, a sell operation, an operation to fill a buy order, and an operation to fill a sell order. An operation is performed by one or more nodes of a network. A node may represent a processing device such as a computer terminal, peripheral device, or mobile device. An operation of the token escrow swap process can be performed by a combination of processing devices. As such, different aspects of an operation may be performed by different processing devices. Accordingly, although FIGS. 4A through 4D refer to individual nodes, each node may represent a combination of nodes or devices.

A buy/sell order that is placed on the GLASS network is submitted to an application programming interface (API), which converts each order into an encoded transaction that is submitted to the blockchain. The submission of a buy/sell order represents and intent that authorizes a withdrawal of tokens. The buy/sell order persists on the blockchain. Once the other half of the buy/sell order is submitted, and a match is made, due to allowances that were granted for the swap, the assets are pulled from addresses for assets of the buyer and seller. The pulled assets are immediately swapped and transferred between buyer and seller nodes. The orders can be any type of order including a limit order or market order, for example. Further, the matching of buy-sell orders can be performed manually or automatically to balance the costs of utilizing the blockchain.

Figure 4A:
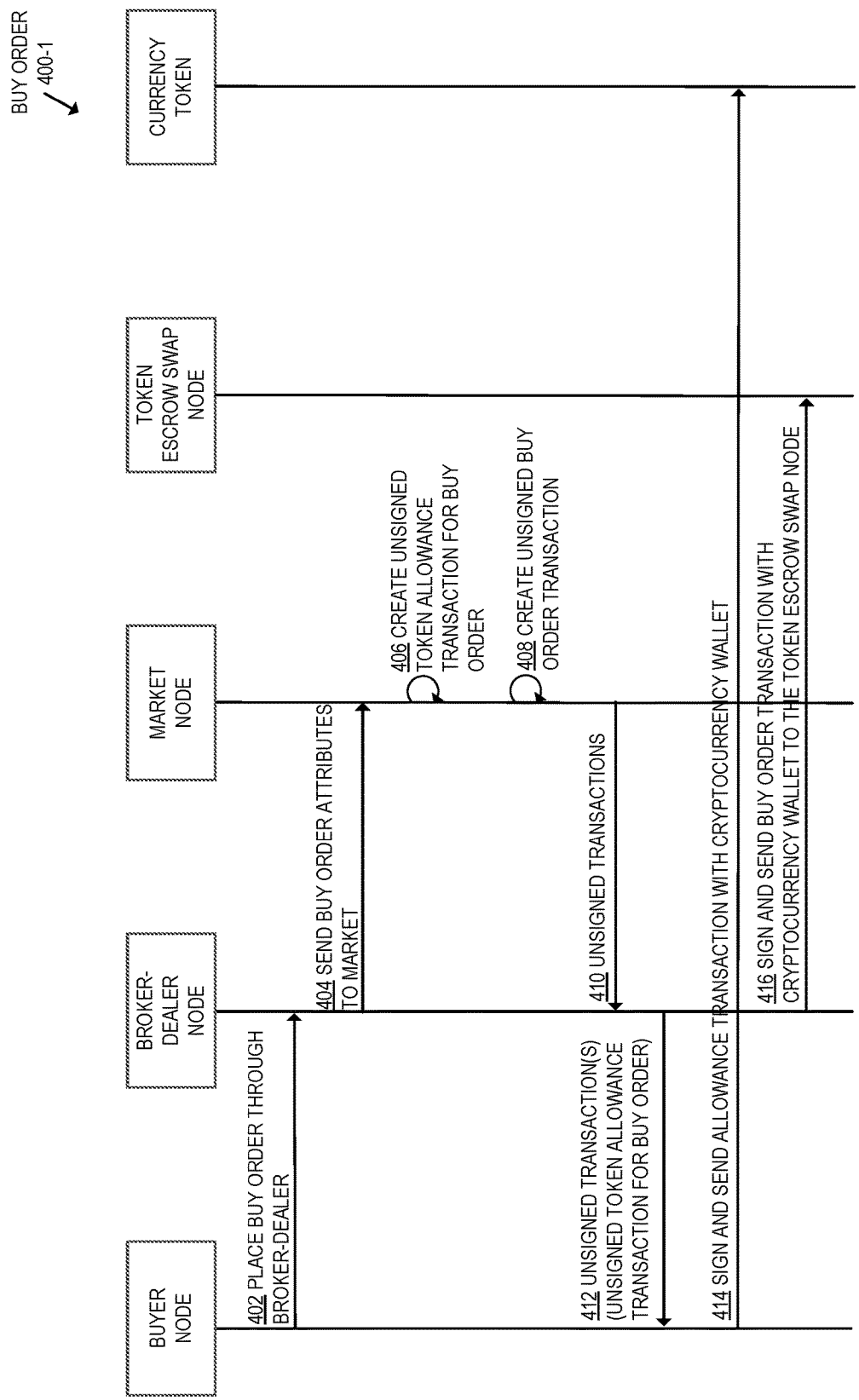
FIG. 4A is a flow diagram for a buy order operation of a token escrow swap according to some embodiments of the present disclosure.

FIG. 4A is a flow diagram for a buy order operation 400-1 of the token escrow swap according to some embodiments of the present disclosure. In step 402, a buyer node places a buy order through a broker-dealer node. In step 404, the broker-dealer node sends attributes of the buy order to a market node. The attributes may include any of approved variables associated with the network or providers.

In step 406, the market node creates an unsigned token allowance transaction for the buy order. In step 408, the market node creates an unsigned buy order transaction. In step 410, the unsigned transactions are sent by the market node to the broker-dealer node. In step 412, the unsigned allowance transaction is sent by the broker-dealer node to the buyer node. In step 414, the buyer node signs the allowance transaction and sends the signed allowance transaction with a cryptocurrency wallet for cryptocurrency tokens. In step 416, the broker-dealer node signs and sends the buy order transaction with a cryptocurrency wallet to a token escrow swap node.

The cryptocurrency wallet may include a device, physical medium, program or a service that stores public and/or private keys and can be used to track ownership, receive, or spend a cryptocurrency. In some embodiments, the cryptocurrency wallet is an Ethereum wallet that connects to the Ethereum blockchain to manage, transfer, or receive ethers and to interact with ERC20 tokens on the Ethereum blockchain. An example is a MetaMask wallet, which is an Ethereum wallet that lets a user connect to the Ethereum blockchain. In some embodiments, an Ethereum wallet is a web wallet that has several extensions for different browsers. As an Ethereum wallet, a user can use it for managing, transferring, receiving Ethers and to interact with numerous ERC20 tokens on the Ethereum blockchain. The Ethereum wallet also allows a user to access the decentralized web by using several Ethereum DApps.

Figure 4B:
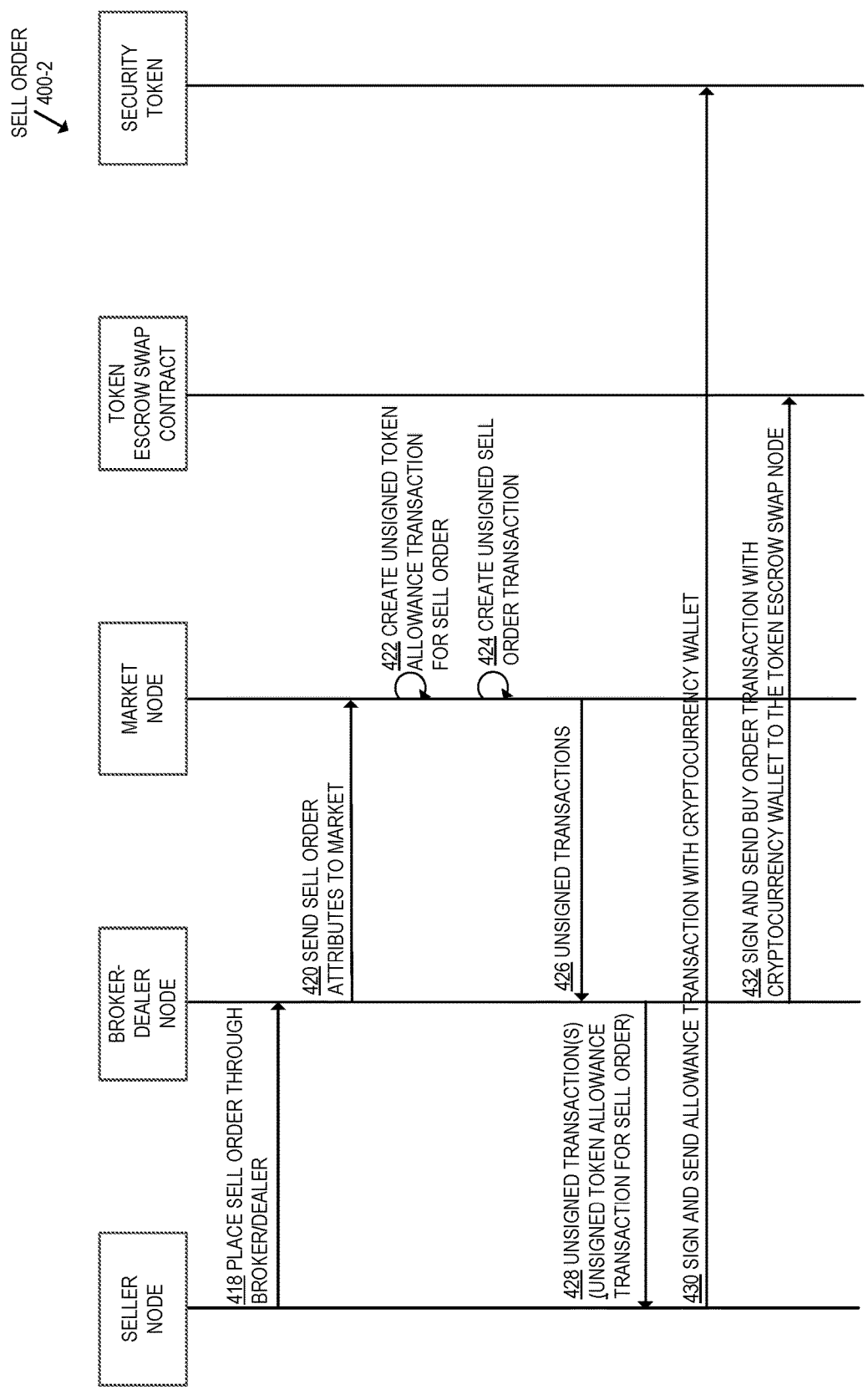
FIG. 4B is a flow diagram of a sell order operation of a token escrow swap according to some embodiments of the present disclosure.

FIG. 4B is a flow diagram of a sell order operation 400-2 of the token escrow swap according to some embodiments of the present disclosure. In step 418, a seller node places an order through the broker-dealer node. In step 420, the broker-dealer node sends attributes of the sell order to the market node. In step 422, the market node creates an unsigned token allowance transaction for the sell order. In step 424, the market node creates an unsigned sell order transaction. In step 426, the unsigned transactions are sent by the market node to the broker-dealer node. In step 428, the unsigned allowance transaction is sent by the broker-dealer node to the buyer node. In step 430, the buyer node signs the allowance transaction and sends the signed allowance transaction with a cryptocurrency wallet for security tokens. In step 432, the broker-dealer node signs and sends the sell order transaction with a cryptocurrency wallet to the token escrow swap node.

Figure 4C:
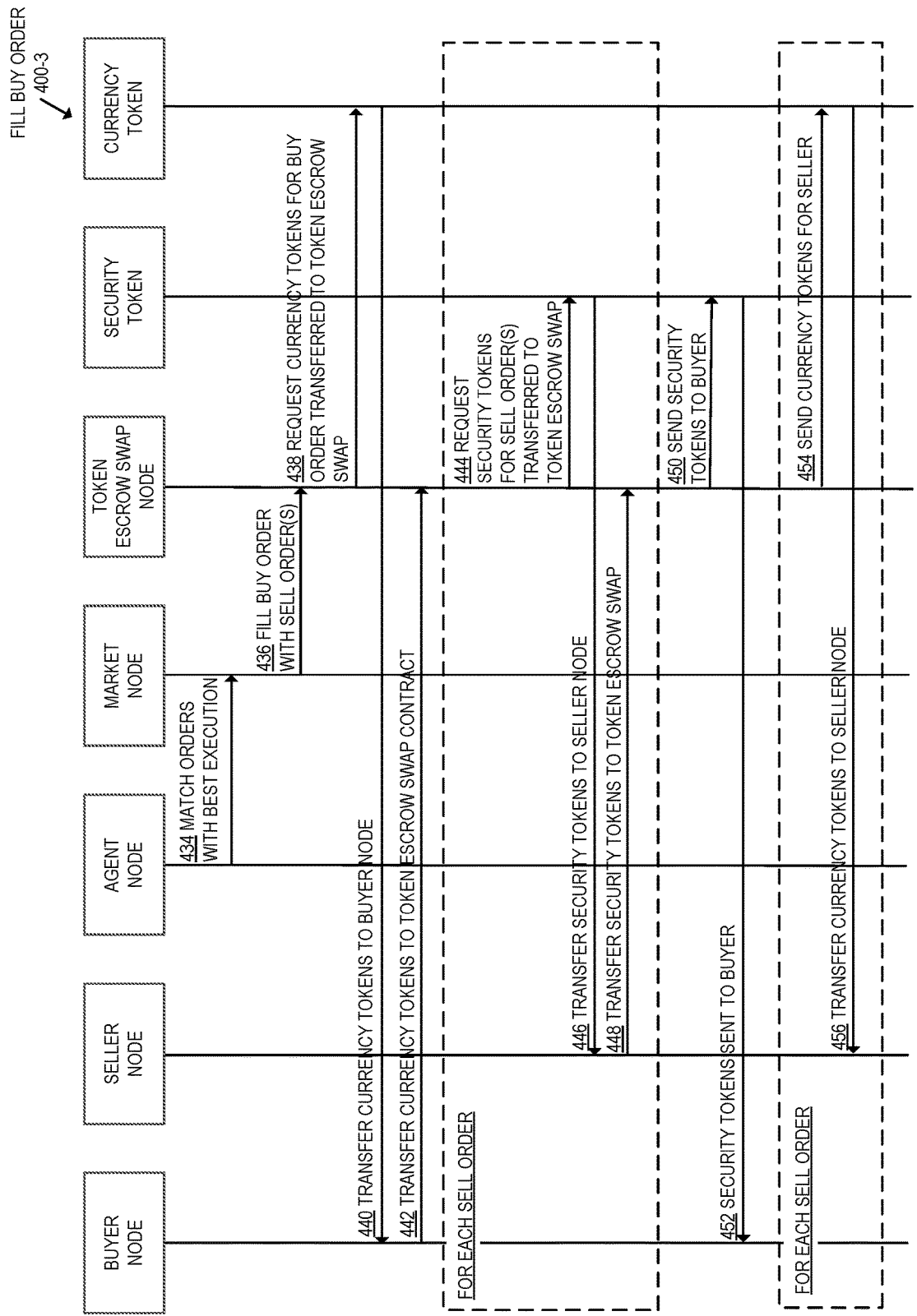
FIG. 4C is a flow diagram of an operation to fill a buy order for a token escrow swap according to some embodiments of the present disclosure.

FIG. 4C is a flow diagram of an operation 400-3 to fill a buy order for the token escrow swap according to some embodiments of the present disclosure. In step 434, an agent node matches buy/sell orders with a Best Execution for the market node. In step 436, the market node causes filling of the buy order with sell orders through the token escrow swap node in accordance with the buy/sell order matching. In step 438, a request is made to transfer currency tokens to the token escrow swap for the buy order. In step 440, the currency tokens are transferred to the buyer node. In step 442, the currency tokens are then transferred from the buyer node to the token escrow swap node.

For each sell order, a sequence of three ordered steps 444, 446, and 448 is performed. In step 444, a request is made by the token escrow swap node to transfer security tokens to the token escrow swap for the sell orders. In step 446, the security tokens are transferred to the seller node. In step 448, security tokens are then transferred from the seller node to the token escrow swap node.

In step 450, the token escrow swap node sends the security tokens to the buyer node. In step 452, the security tokens are sent to the buyer node.

For each sell order, a sequence of two ordered steps 454 and 456 are performed. In step 454, the token escrow swap node sends currency tokens for the seller node. In step 456, the currency tokens are received by the seller node.

Figure 4D:
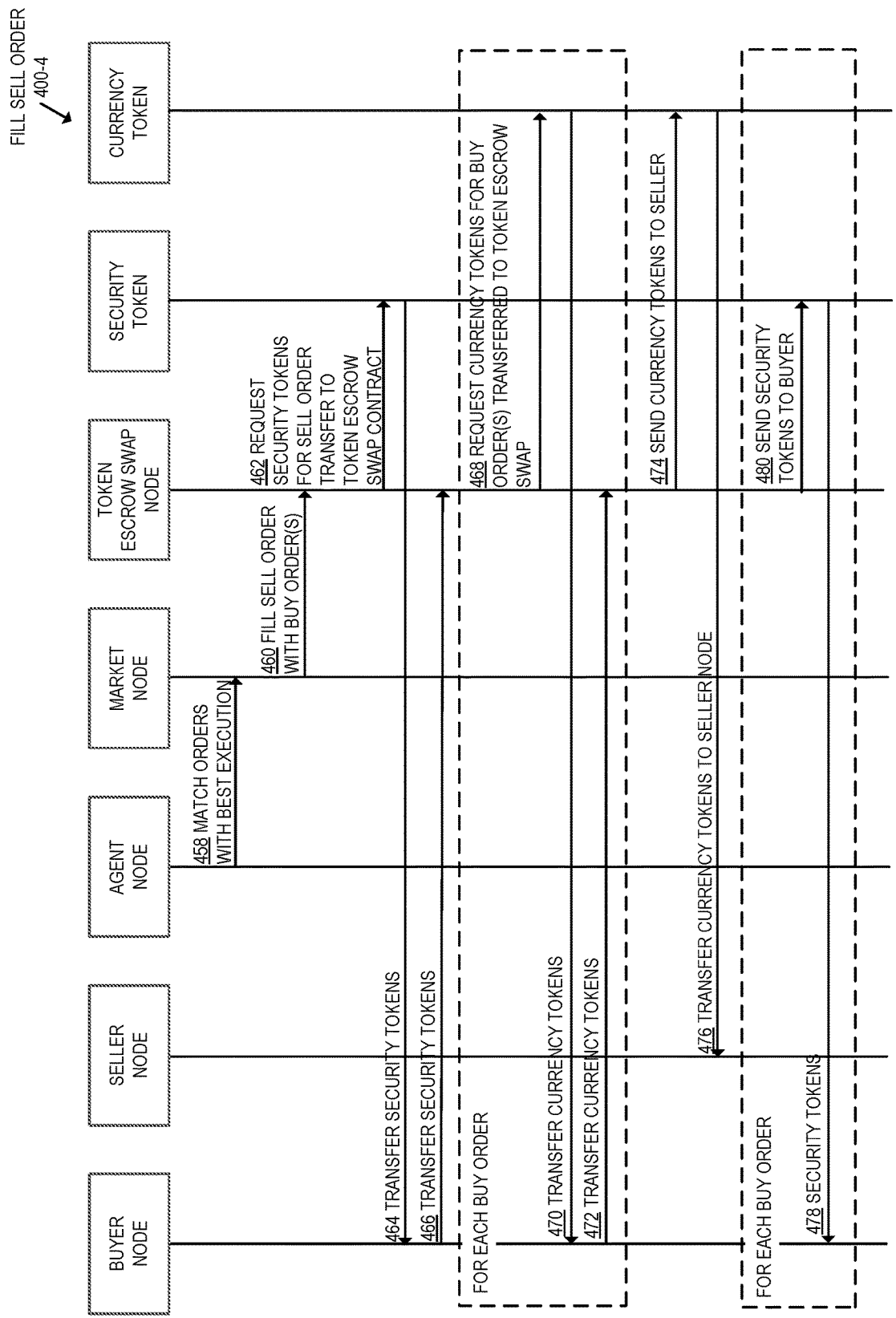
FIG. 4D is a flow diagram of an operation to fill a sell order for a token escrow swap according to some embodiments of the present disclosure.

FIG. 4D is a flow diagram of an operation 400-4 to fill a sell order for the token escrow swap according to some embodiments of the present disclosure. In step 458, the agent node matches buy/sell orders with a Best Execution for the market node. In step 460, the market node causes filling of the sell order with buy order(s) through the token escrow swap node. In step 462, a request is made to transfer security tokens to the token escrow swap node for the sell order. In step 464, the security tokens are transferred to the seller node. In step 464, the security tokens are transferred from the seller node to the token escrow swap node.

For each buy order, a sequence of three ordered steps 468, 470, and 472 is performed. In step 468, a request is made by the token escrow swap node to transfer currency tokens to the token escrow swap for the buy orders. In step 470, the requested currency tokens are then transferred to the buyer node. In step 472, the currency tokens are transferred from the buyer node to the token escrow swap node.

In step 474, the token escrow swap node sends currency tokens for the seller node. In step 476, the currency tokens are sent to the seller node.

For each buy order, a sequence of two ordered steps 478 and 480 is performed. In step 478, the token escrow swap node sends security tokens for the buyer node. In step 480, the security tokens are received by the buyer node.

Figure 6:
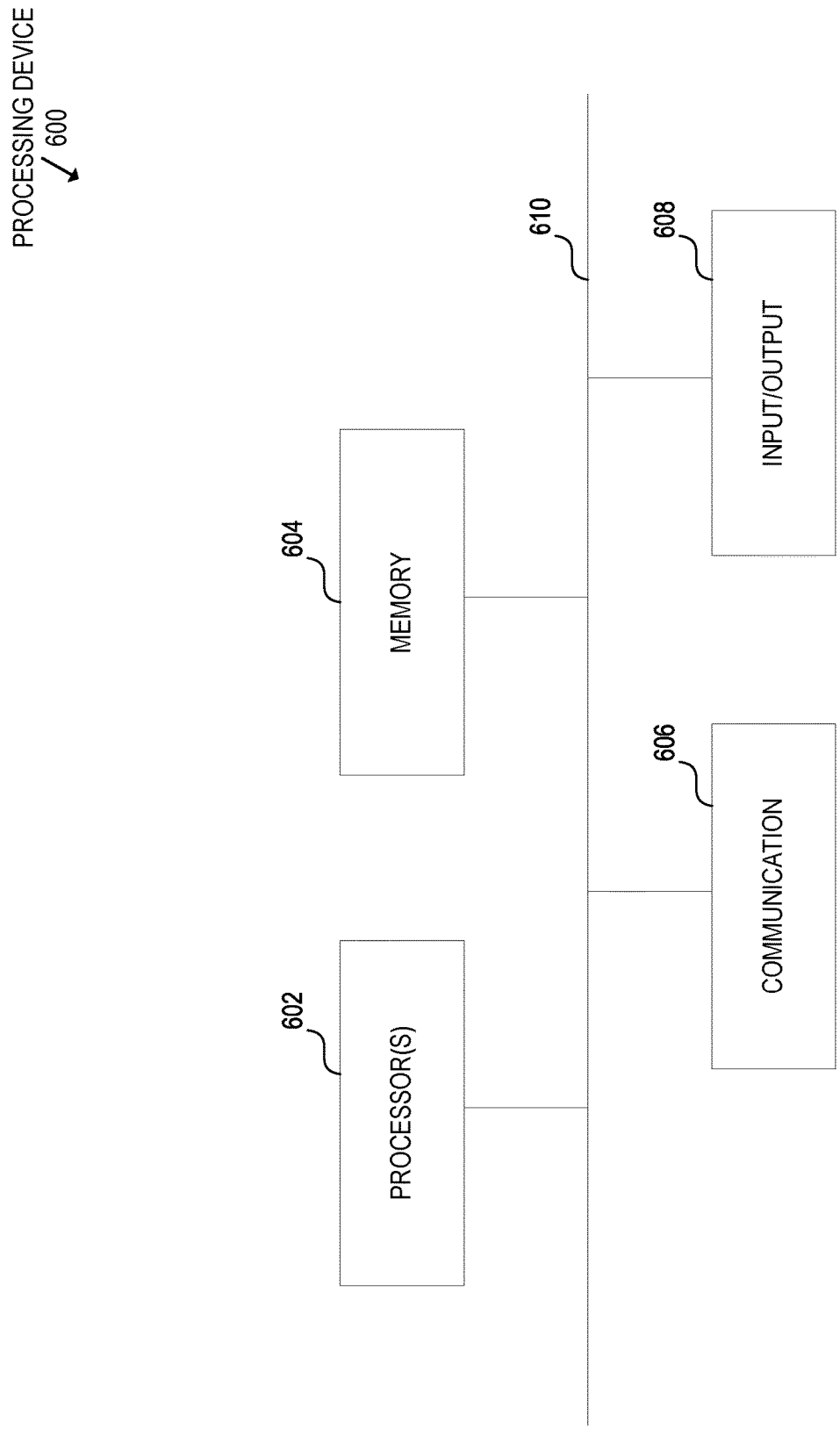
FIG. 6 is a block diagram that illustrates an example processing device in which aspects of the disclosed technology can be embodied.

FIG. 6 is a block diagram illustrating an example of a processing device in which at least some operations described herein can be implemented. The processing system can be processing device 600, which represents a system that can run any of the methods/algorithms described above. A system may include two or more processing devices such as represented in FIG. 6, which may be coupled to each other via a network or multiple networks. A network can be referred to as a communication network.

In the illustrated embodiment, the processing device 600 includes one or more processors 602, memory 604, a communication device 606, and one or more input/output (I/O) devices 608, all coupled to each other through an interconnect 610. The interconnect 610 may be or include one or more conductive traces, buses, point-to-point connections, controllers, adapters and/or other conventional connection devices. Each of the processors 602 may be or include, for example, one or more general-purpose programmable microprocessors or microprocessor cores, microcontrollers, application specific integrated circuits (ASICs), programmable gate arrays, or the like, or a combination of such devices.

The processor(s) 602 control the overall operation of the processing device 600. Memory 604 may be or include one or more physical storage devices, which may be in the form of random-access memory (RAM), read-only memory (ROM) (which may be erasable and programmable), flash memory, miniature hard disk drive, or other suitable type of storage device, or a combination of such devices. Memory 604 may store data and instructions that configure the processor(s) 602 to execute operations in accordance with the techniques described above. The communication device 606 may be or include, for example, an Ethernet adapter, cable modem, Wi-Fi adapter, cellular transceiver, Bluetooth transceiver, or the like, or a combination thereof. Depending on the specific nature and purpose of the processing device 600, the I/O devices 608 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM), random-access memory (RAM), magnetic disk storage media, optical storage media, flash memory devices), etc.

Note that any and all of the embodiments described above can be combined with each other, except to the extent that it may be stated otherwise above or to the extent that any such embodiments might be mutually exclusive in function and/or structure. Although the present invention has been described with reference to specific exemplary embodiments, it will be recognized that the invention is not limited to the embodiments described but can be practiced with modification and alteration within the spirit and scope of the disclosed embodiments. Accordingly, the specification and drawings are to be regarded in an illustrative sense rather than a restrictive sense.

Physical and functional components (e.g., devices, engines, modules, and data repositories) associated with processing device 600 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer-readable data storage. The tangible storage memory may be volatile or non-volatile memory. In some embodiments, the volatile memory may be considered "non-transitory" in the sense that it is not a transitory signal. Memory space and storage described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing separate method steps or a method step of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems and devices described above may include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

What is claimed is:

1. A computer-readable storage medium for generating a trading interface for a digital currency escrow swap, excluding transitory signals and carrying instructions, which, when executed by at least one data processor of a system, cause the system to:
provide a display interface of the trading interface displaying one or more graphical elements,
wherein at least one graphical element is linked to at least one electronic wallet that stores cryptographic keys to access digital currency,
wherein each of multiple graphical elements presents information of one or more digital securities based on one or more of:
valuation benchmarks, or
valuation indices for an associated digital security;
perform a first operation including causing the system to:
request a first transfer of a particular digital currency using a first set of associated cryptographic keys in a first electronic wallet to an escrow swap node; and
receive the requested particular digital currency via a transfer-in party node;
perform a second operation including causing the system to:
request a second transfer of an offered digital security using a second set of associated cryptographic keys in a second electronic wallet to the escrow swap node; and
receive the requested digital security by the escrow swap node via a transfer-out party node;
perform a third operation including causing the escrow swap node to:
provide the first set of associated cryptographic keys in the second electronic wallet to the transfer-in party node, to allow the transfer-in party node to access the offered digital security; and
provide the second set of associated cryptographic keys in the first electronic wallet to the transfer-out party node, to allow the transfer-out party node to access the requested particular digital currency;
update the valuation benchmarks or the valuation indices based on one or more of:
the first operation,
the second operation, or
the third operation; and
in response to performing the first operation, the second operation, and the third operation, dynamically update the one or more graphical elements on the display interface to reflect one or more of:
the updated valuation benchmarks, or
the updated valuation indices for the associated digital security.

2. The computer-readable storage medium of claim 1, wherein the instructions further cause the system to, prior to performing the first operation:
transmit the request of the first transfer and the request of the second transfer to a blockchain smart contract,
wherein the blockchain smart contract automatically executes the first operation, the second operation, and the third operation based on predetermined triggers.

3. The computer-readable storage medium of claim 1, wherein the instructions further cause the system to:
monitor prices of tokens associated with the offered digital security; and
display the monitored prices associated with the offered digital security on the display interface of the trading interface,
wherein the system provides access of the display interface to a first set of users within users of the trading interface.

4. The computer-readable storage medium of claim 1, wherein the particular digital currency includes security tokens,
wherein the security tokens are a cryptographic representation of an interest in an underlying asset, and
wherein the interest in the underlying asset is recorded on a blockchain platform.

5. The computer-readable storage medium of claim 1, wherein a digital wallet stores at least one of:
a public key, or a private key of the particular digital currency of the digital currency escrow swap,
wherein the public key is an identifier associated with the first transfer, and
wherein the private key authorizes a corresponding cryptographic key.

6. The computer-readable storage medium of claim 1, wherein the one or more graphical elements comprises:
a first axis indicating a price for the one or more digital securities;
a second axis indicating a range of time; and a graphic overlay indicating a particular price for a particular security on the first axis and a particular time on the second axis.

7. The computer-readable storage medium of claim 1, wherein the one or more graphical elements comprises one or more of:
a graphical chart visually indicating historical price data or trading volume of the one or more digital securities; or
a table depicting an order log including one or more of: asset price or asset quantity.

8. A computer-implemented method for generating a trading interface, comprising:
causing display, on the trading interface, of one or more graphical elements,
wherein each graphical element presents information of an associated digital security;
receiving a set of values associated with a particular graphical element,
wherein the particular graphical element is associated with a particular digital security, and
wherein the set of values is based on one or more of: valuation benchmarks or valuation indices for the particular digital security;
in response to the set of values, causing presentation of content indicative of the set of values for the particular digital security on the trading interface;
receiving an indication of a transfer of the particular digital security from an escrow swap node to a transfer-in party node,
wherein the escrow swap node is configured to receive the particular digital security from a transfer-out party node, and
wherein the escrow swap node is configured to, in response to receiving the particular digital security, transfer the particular digital security to the transfer-in party node;
in response to receiving the indication of the transfer of the particular digital security, dynamically updating the set of values for the particular digital security based on the received indication of the transfer of the particular digital security,
wherein the updated set of values is indicative of one or more of:
updated valuation benchmarks or updated valuation indices for the particular digital security;
in response to the updated set of values, dynamically updating the content based on the updated set of values; and
causing presentation of the updated content on the trading interface.

9. The computer-implemented method of claim 8, wherein the particular graphical element comprises one or more of:
a graphical chart visually indicating historical price data or trading volume of one or more digital securities; or
a table depicting an order log including one or more of: asset price or asset quantity.

10. The computer-implemented method of claim 8, comprising:
receiving a communication from the transfer-out party node related to the particular digital security,
wherein the communication contains instructions associated with the transfer of the particular digital security; and
transmitting the communication to the transfer-in party node through the trading interface.

11. The computer-implemented method of claim 8,
wherein the particular digital security includes security tokens,
wherein the security tokens are a cryptographic representation of an interest in an underlying asset, and
wherein the interest in the underlying asset is recorded on a blockchain platform.

12. The computer-implemented method of claim 8, comprising:
maintaining previous content of the particular digital security,
wherein the previous content of the particular digital security is the content prior to updating;
generating a graphic overlay on the trading interface comprising a third content indicative of the previous content for the particular digital security; and
causing display of the third content on the trading interface.

13. The computer-implemented method of claim 8, wherein the one or more graphical elements comprises:
a first axis indicating a price for one or more digital securities;
a second axis indicating a range of time; and
a graphic overlay indicating a particular price for a particular security on the first axis and a particular time on the second axis.

14. The computer-implemented method of claim 13, further comprising:
monitoring prices of tokens associated with the particular digital security; and
displaying the monitored prices associated with the particular digital security on a display interface of the trading interface,
wherein the trading interface provides access to the display interface to a first set of users within users of the trading interface.

15. A system comprising:
at least one hardware processor; and
at least one non-transitory memory storing instructions, which, when executed by the at least one hardware processor, cause the system to:
cause display, on a trading interface, of one or more graphical elements,
wherein each graphical element presents information of an associated digital security;
receive a first set of values associated with a particular graphical element,
wherein the particular graphical element is associated with a particular digital security, and
wherein the first set of values is based on one or more of: valuation benchmarks or valuation indices for the particular digital security;
in response to the first set of values, cause presentation of content indicative of the first set of values for the particular digital security on the trading interface;
receive a second set of values associated with the particular graphical element,
wherein the second set of values is based on one or more of:
updated valuation benchmarks or updated valuation indices for the particular digital security, and
wherein the second set of values is generated responsive to an indication of a digital security transfer;
in response to the second set of values, dynamically update the content based on the second set of values; and cause presentation of the updated content on the trading interface.

16. The system of claim 15, wherein the instructions further cause the system to:
provide access, to multiple users of the trading interface, to a company page within the trading interface,
wherein the access to each of the multiple users is conditional based on predetermined conditions.

17. The system of claim 15, wherein the instructions further cause the system to:
receive a communication from a transfer-out party node related to a transfer of the particular digital security; and
transmit the communication to a transfer-in party node related to the transfer of the particular digital security through the trading interface.

18. The system of claim 15, wherein the instructions further cause the system to:
monitor prices of tokens associated with the particular digital security; and
display the monitored prices associated with the particular digital security on a display interface of the trading interface,
wherein the system provides access to the displayed interface to a first set of users within users of the trading interface.

19. The system of claim 15, wherein the instructions further cause the system to:
maintain previous content of the particular digital security,
wherein the previous content of the particular digital security is the content prior to updating;
generate a graphic overlay on the trading interface comprising a third content indicative of the previous content for the particular digital security; and
cause display of the third content on the trading interface.

20. The system of claim 15, wherein the one or more graphical elements comprises:
a first axis indicating a price for one or more digital securities;
a second axis indicating a range of time; and
a graphic overlay indicating a particular price for a particular security on the first axis and a particular time on the second axis.

* * * * *